United States Patent
Maia et al.

(10) Patent No.: US 8,618,932 B2
(45) Date of Patent: Dec. 31, 2013

(54) DEVICE LOCATION DETECTION

(75) Inventors: Eduardo de Mello Maia, Seattle, WA (US); Stuart Alan Wyatt, Camano Island, WA (US); Henry Hooper Somuah, Seattle, WA (US); Cesare John Saretto, Seattle, WA (US); Dillon Shane Lynch, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 307 days.

(21) Appl. No.: 13/051,566

(22) Filed: Mar. 18, 2011

(65) Prior Publication Data

US 2012/0235812 A1    Sep. 20, 2012

(51) Int. Cl.
  *G08B 1/08*    (2006.01)
(52) U.S. Cl.
  USPC ............... 340/539.13; 340/572.8; 340/8.1
(58) Field of Classification Search
  USPC ......... 340/539.13, 572.1, 572.8, 8.1, 539.1, 340/539.15, 539.23, 539.2, 539.21, 539.19
  See application file for complete search history.

(56) References Cited

U.S. PATENT DOCUMENTS

| | | | | |
|---|---|---|---|---|
| 6,983,418 | B1 * | 1/2006 | Scott ........................... | 715/700 |
| 8,244,236 | B2 * | 8/2012 | Roumeliotis et al. ......... | 455/424 |
| 2002/0168943 | A1 | 11/2002 | Callaway et al. | |
| 2002/0191504 | A1 * | 12/2002 | Takeda ........................ | 369/44.29 |
| 2004/0229565 | A1 * | 11/2004 | Himeno ........................ | 455/41.2 |
| 2005/0187873 | A1 * | 8/2005 | Labrou et al. .................. | 705/40 |
| 2006/0242022 | A1 * | 10/2006 | Hashimoto et al. ............ | 705/14 |
| 2007/0123268 | A1 * | 5/2007 | Parata ......................... | 455/456.1 |
| 2008/0109317 | A1 | 5/2008 | Singh | |
| 2008/0274752 | A1 * | 11/2008 | Houri .......................... | 455/456.1 |
| 2009/0138353 | A1 | 5/2009 | Mendelson | |
| 2009/0221320 | A1 | 9/2009 | Walley et al. | |
| 2010/0322077 | A1 | 12/2010 | Cho et al. | |
| 2011/0064000 | A1 | 3/2011 | Kim et al. | |

OTHER PUBLICATIONS

International Search Report in PCT Application No. PCT/US2012/028834 dated Jul. 27, 2012, 8 pgs.
Hazas, et al., "A Relative Positioning System for Co-Located Mobile Devices", Retrieved at << http://eis.comp.lancs.ac.uk/fileadmin/eis/publication/2005-Relative-Positioning.pdf >>, The 3rd International Conference on Mobile Systems, Applications and Services, Jun. 6-8, 2005, pp. 177-190.

(Continued)

*Primary Examiner* — Daniel Previl
(74) *Attorney, Agent, or Firm* — Microsoft Corporation

(57) ABSTRACT

One or more techniques and/or systems are disclosed for improving location awareness of a device. A device position can be determined (e.g., via GPS or some location service), and this position can be used to identify a user-experience that may be in an area around the device, such as within a desired position threshold. A near-field radio system beacon that is associated with the user-experience can be activated in order to identify a distance of the device from the beacon. The beacon can use a near-field radio system ID associated with the device to identify the device, and determine a distance to the device. When a user moves the device to within a threshold distance from the beacon, the user-experience can be activated on the device, such that the user may interact with the user-experience (e.g., to hear a description of artwork as the user navigates through a museum).

20 Claims, 8 Drawing Sheets

(56) References Cited

OTHER PUBLICATIONS

Chawathe, Sudarshan S., "Beacon Placement for Indoor Localization using Bluetooth", Retrieved at << http://ieeexplore.ieee.org/stamp/stamp.jsp?tp=&arnumber=4732690&isnumber=4732517 >>, 11th International IEEE Conference on Intelligent Transportation Systems, Oct. 12-15, 2008, pp. 980-985.

Li, et al., "Research of Indoor Local Positioning based on Bluetooth Technology", Retrieved at << http://ieeexplore.ieee.org/stamp/stamp.jsp?arnumber=05302300 >>, 5th International Conference on Wireless Communications, Networking and Mobile Computing, Sep. 24-26, 2009, pp. 4.

Cheung, et al., "An Inexpensive Bluetooth-Based Indoor Positioning Hack", Retrieved at << http://architecture.mit.edu/house_n/documents/CheungIntilleLarson2006.pdf >>, In Proceedings of UbiComp, 2006, pp. 2.

Thapa, et al., "An Indoor Positioning Service for Bluetooth Ad Hoc Networks", Retrieved at << http://www.eie.polyu.edu.hk/~enmzwang/eie555/handouts/HomeworkOrAssignments/reading-assgn/Thapa.pdf >>, 2003, pp. 11.

* cited by examiner

DEVICE LOCATION DETECTION

BACKGROUND

As computing devices have become more portable, mobile computing has become more interactive with a user's surroundings. For example, a mapping application can run on the user's mobile computing device (e.g., smartphone) that allows the user to identify their approximate location. Further, points of interest, retails establishments, entertainment venues, and more, can be indicated on the mapping application, for example, which can be searched for, and/or identified as the user moves through an area. Typically, mobile devices use global positioning systems (GPS), which utilize satellite triangulation, or some sort of signal triangulation (e.g., mobile phone signal) to identify the approximate location of the user. This location information can be used by various applications on the user's device, such as to provide appropriate and relevant local information, identify the user's location for social networking, and more.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

Current global positioning systems (GPS) and/or other location identification services used on mobile devices may not provide needed fidelity for some user-experience, such as applications running on the mobile device. For example, the GPS systems can have an error range of thirty to fifty feet, which may not provide needed fidelity when the user-experience needs the user to be immediately proximate to a specific location. Further, while the GPS can provide an approximate position of the user relative to a mapped point, a distance from the user to a particular object may not meet granularity requirements to properly interact, such as with an ATM, or console attached to a monitor.

Additionally, GPS-type location tracking lose reliability when the device is inside a building or under cover. Even in optimal conditions, a GPS may not be able tell that the user is inside a building, standing in front of a painting on the wall of the third floor lobby. Further, even if it could, the location cannot be verified by a 3rd party. For example, GPS locations (and others) can be spoofed, thereby providing an incorrect location of the device. Applications may be used that create false coordinates, and/or grid sectors, to be provided to a requesting application. Typically, the provided GPS coordinates are all that is used to identify the user's location, for example, and they are not verified by a third party.

Accordingly, one or more techniques and/or systems are disclosed that utilize a combination at least two device locating sources. For example, a position can initially be determined by GPS coordinates for the device, and verified using a near-field radio system signal, such as Bluetooth. It will be appreciated that near-field and/or the like as used herein is not mean to be overly limiting. For example, use of near-field and/or the like is not meant to exclude rfid, wi-fi, very close proximity, short range-low power and/or the like, but is instead intended to comprise implementations such as these (and others) as well. Moreover, while Bluetooth is mentioned as an example herein, other near-field, rfid, wi-fi, very close proximity, short range-low power, etc. implementations (e.g., that are suitable to provide a more accurate, precise, exacting, etc. device location/verification) are envisioned as well. The combined location awareness provided herein can help determine an actual position of the user's mobile computing device relative to specific physical locations. As an example, a location of a user-experience (e.g., where the user can interact with their surroundings using their mobile device, such as navigating through a museum to experience descriptions of different artistic displays) can have a Bluetooth radio beacon that can be used to determine a position of a device relative to the beacon with a greater degree of granularity than merely GPS (and/or other techniques) alone. Further, in this example, the user's device may not need to perform pairing operations with the beacon, but merely transmit a signal for a distance to be identified.

In one embodiment for improving location awareness of a device, a position of the device in a location positioning system, such as a GPS, is identified. Using the position of the device, a user-experience can be identified for the device within a desired threshold (e.g., an area around the device). A near-field radio system beacon (e.g., Bluetooth beacon) that is associated with the user-experience can be activated in order to identify a distance of the device from the beacon. The beacon can use a near-field radio system ID associated with the device to identify the device, for example, and determine signal strength. Upon determining that the device is within a threshold distance from the beacon, such as when the user moves the device toward the beacon and is close enough, the user-experience (e.g., application) can be activated on the device. It will be appreciated that, in one example, the radio system ID may comprise an ID of the device, and may be tied more to a protocol associated with the device than to a radio system of the device.

To the accomplishment of the foregoing and related ends, the following description and annexed drawings set forth certain illustrative aspects and implementations. These are indicative of but a few of the various ways in which one or more aspects may be employed. Other aspects, advantages, and novel features of the disclosure will become apparent from the following detailed description when considered in conjunction with the annexed drawings.

DETAILED DESCRIPTION

Figure 1:
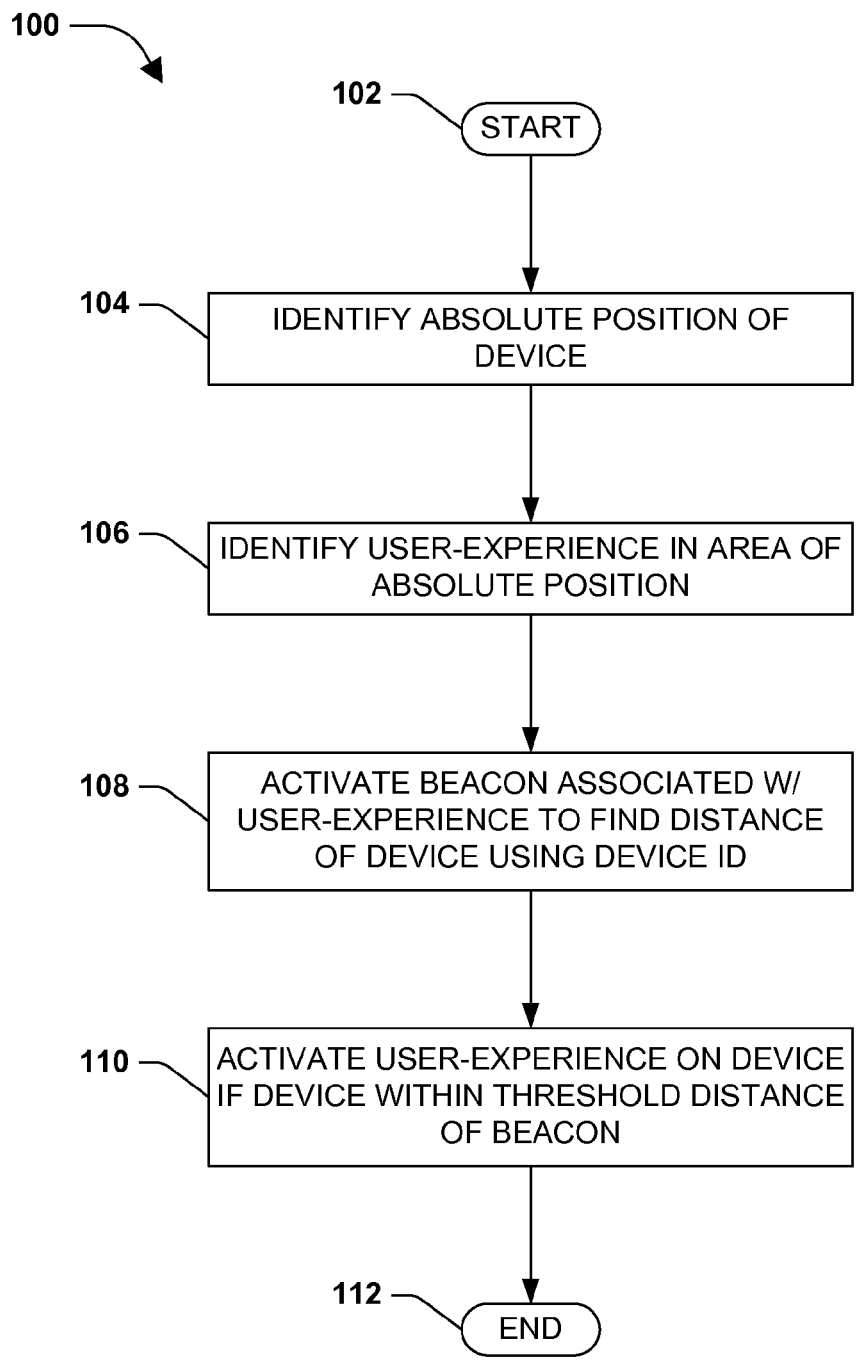
FIG. 1 is a flow diagram of an exemplary method for improving location awareness of a device.

The claimed subject matter is now described with reference to the drawings, wherein like reference numerals are generally used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, structures and devices are shown in block diagram form in order to facilitate describing the claimed subject matter.

A method may be devised that provides for determining a position of a user's device when in proximity to desired locations, for example, that comprises one or more user experiences, such as mobile device applications that are interactive with the user's current environment. For example, while a global positioning system (GPS) enabled mobile device can approximate a location of the user's device, the GPS may not be able to provide enough fidelity to determine when the user is proximate to a desired location, such as an interactive kiosk, particularly when the user is located inside a building. Techniques, described herein, may provide for using two locating technologies to improve the location awareness of the device, particularly when proximate to a desired location.

FIG. 1 is a flow diagram of an exemplary method 100 for improving location awareness of a device. The exemplary method 100 begins at 102 and involves identifying a position of the device in a positioning system (e.g., global positioning system (GPS)), at 104. For example, the device can comprise a GPS locator that enables a position for the device to be identified by the GPS. A position can comprise a position on the earth identified by triangulating the GPS locator in the device using three or more GPS satellites, for example. A position may be expressed in coordinates (e.g., latitude and longitude), grid locations, or some other mapping/locating techniques (e.g., proprietary quadrant location).

At 106, a user-experience is identified within a desired threshold of the position. For example, the user-experience can comprise the user interacting with one or more devices in proximity to the user, using their mobile device, such as a smartphone. As an illustrative example, while traveling around a city the user may approach a proximity of a museum comprising interactive kiosks. In this illustrative example, when the GPS locator in the user's mobile device indicates the user's position is within the desired threshold (e.g., near to the museum building) of the museum user-experience, the (availability of the) museum user-experience can be identified for the user (e.g., indicated on their mobile device, such as in a mapping service application).

At 108, a near-field radio system beacon associated with the user-experience can be activated to identify a distance of the device from the beacon, using a near-field radio system ID for the device. For example, a near-field radio system can comprise a Bluetooth system, which uses radio transmissions for securely exchanging data over relatively short distances. It will be appreciated that the techniques described herein are not merely limited to Bluetooth, and may comprise any radio system, such as wifi, RFID, wireless device communications (e.g., cordless telephones, console controllers), near-field communications, etc.

In one embodiment, the user-experience may comprise one or more beacons that transmit and receive near-field radio system signals, and can be used to detect a distance of device by detecting signal strength, for example. As an example, the user device may comprise near-field radio system communication component (e.g., a Bluetooth transmitter/receiver) that uses a near-field radio system ID particular to the device. In this example, when the device's near-field radio system communication component is activated, the beacon can attempt to detect the signal from the device. Further, in this example, a strength of the signal can indicate a distance between the device and the beacon (e.g., a weaker signal can indicate a greater distance).

At 110 in the exemplary method 100, upon determining that the device is within a distance threshold from the beacon, the user-experience is activated on the device. For example, the user-experience can comprise an application (e.g., web-based application) that runs, at least partially, on the user's device, such as in a browser or some application with a network link (e.g., over the Internet) to a remote server comprising an application portion of the experience. As an illustrative example, the beacon can detect that the user is standing in front of (or next to) an interactive kiosk for the museum. In this illustrative example, an experience web-app can be activated on the user's mobile device (e.g., provided that such experiences are enabled and/or authorized on the device) that allows the user to interact with the kiosk and/or display(s) associated with the kiosk, such as to identify detailed information, perform tasks, navigate controls, etc.

Having activated the user-experience on the device, the exemplary method 100 ends at 112.

Figure 2:
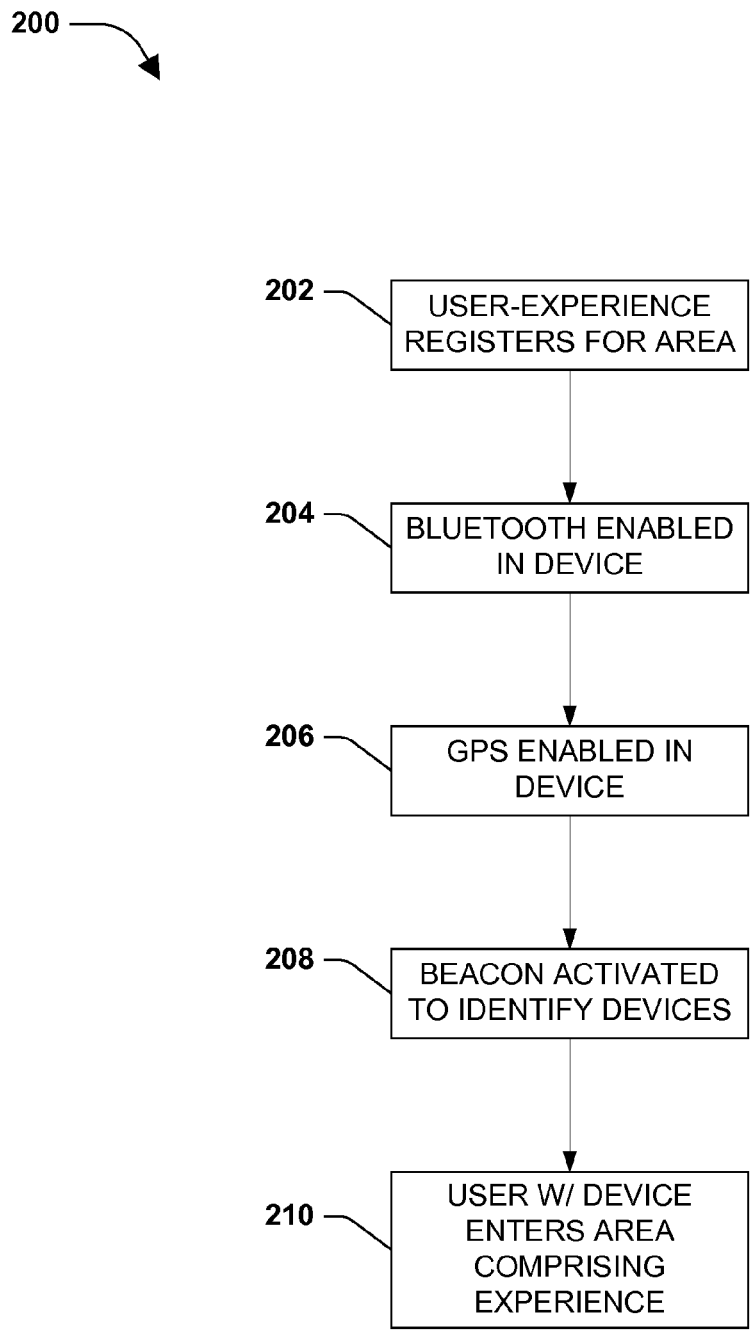
FIG. 2 is a flow diagram illustrating one embodiment of one or more portions of one or more techniques described herein.

FIG. 2 is a flow diagram illustrating one embodiment 200 of one or more portions of one or more techniques described herein. At 202, a user-experience can be registered for an area. A user-experience may comprise some sort of interaction with the user's surroundings using a device, such as a mobile computing device (e.g., smartphone, laptop, etc.). For example, an automated teller machine (ATM) may be registered for an area, and the user-experience may comprise an interaction between the ATM and the user's mobile device.

In one embodiment, the registration of the user experience may comprise registering the user-experience with an experience service, for example, that provides location information to mapping and/or location services used by mobile devices. For example, a retail location may comprise one or more kiosks that can interact with the user's device, and the retail location may register with the experience service as a user-experience for their location. In this example, the experience service may provide the location and user-experience information to a mapping or location service, which can indicate the registered user experience for the location, such as on a mobile map on the device.

At 204 in the example embodiment 200, a near-field radio transmitter receiver, such as a Bluetooth enabled device, can be enabled in the user's device. For example, mobile devices commonly comprise Bluetooth capability, which can be enabled or disabled in the device (e.g., switched on or off). In this embodiment, the Bluetooth capability can be enabled, such that the device may be detected by another Bluetooth enabled device. For example, the shortwave radio transmissions sent out by the Bluetooth component in the user's device may be detected by another Bluetooth enabled device. In one embodiment, the user may be asked to activate the near-field radio system in their device after they associate their device with the user experience, as discussed below.

At 206, a location positioning system, such as a global positioning system (GPS), can be enabled in the user's device. For example, many mobile computing devices comprise GPS components that allow for identifying an approximate position of the device on Earth, using satellites. Other location positioning systems may comprise phone signal triangulation, Internet Protocol (IP) address location identification, and/or other signal triangulation technologies (e.g., Wifi, Wimax, etc.). In this embodiment, for example, in order for the position of the user's device to be identified, the positioning system in the device needs to be enabled (e.g., turn on the GPS, or other location service for the device).

At 208, a near-field radio system beacon can be activated to identify devices in its vicinity. In this embodiment, the beacon's near-field radio system can comprise technology compatible with that found in the user's device, such that the two devices can send and receive near-field radio transmissions between each other. For example, the beacon can comprise a Bluetooth beacon that sends, receives, and detects Bluetooth transmissions to/from other Bluetooth enabled devices, such as the user's device.

As an example, a museum-based user-experience can comprise a plurality of Bluetooth beacons, respectively comprising interactive kiosks that enhance a visitor's museum experience. In this example, the museum beacons may all be activated to identify devices. In another embodiment, one or more selected beacons may be activated, such as to indicate a starting point for a visitor.

At 210 in the example embodiment 200, the user with their mobile device enters an area comprising the user-experience. For example, the user may be looking for an ATM to use, such as by searching with their mobile device, and the user may enter within a desired range from the ATM. As another example, the user may be traveling and entering into and out of areas that comprise user experiences (e.g., museums, shops, points of interest), which can be indicated on their mobile device as they enter an area comprising the user-experience. In one embodiment, when the user's device enters an area comprising the user-experience, the user experience can be identified on the user's device, for example, if registered with an experience service that provides information for a device mapping application.

Figure 3:
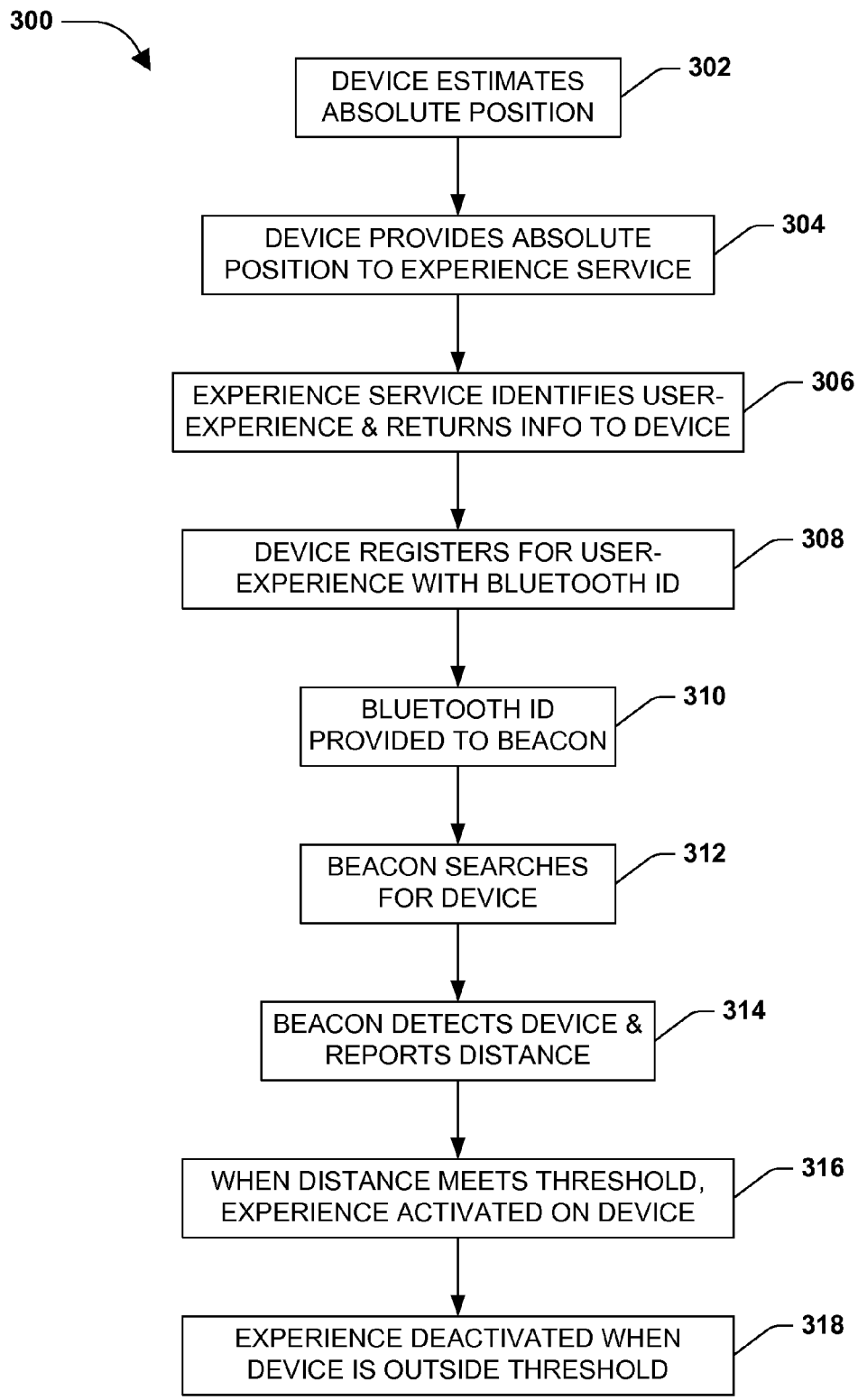
FIG. 3 is a flow diagram illustrating an example embodiment of one or more portions of one or more techniques described herein.

FIG. 3 is a flow diagram illustrating an example embodiment 300 of one or more portions of one or more techniques described herein. At 302, a user's device can estimate its position. In one embodiment, the device can comprise the GPS locator system, which can be enabled to identify the user's global position, where the position may be determined by estimated GPS coordinates (e.g., longitude and latitude). As another example, the position may be provided in grid coordinates on mapping system, for example, that is proprietary to a mapping application running on the device.

In one embodiment, the position may be determined by a location key global position representation. For example, a map of the earth may be divided into quadrants or grid squares (or some other grid shape), which can respectively be assigned a location key. Further, when the map is zoomed into, the zoomed in version of the map can also be divided into quadrants or grid squares, which can respectively be assigned locations keys (e.g., which may be subsets of the higher location key for a larger quadrant). In this embodiment, for example, a position of the device can be assigned a location key (e.g., a quadrant key), which is representative of a quadrant or grid square zoomed to sufficient granularity to accommodate the experience area (e.g., five hundred square feet).

Figure 4:
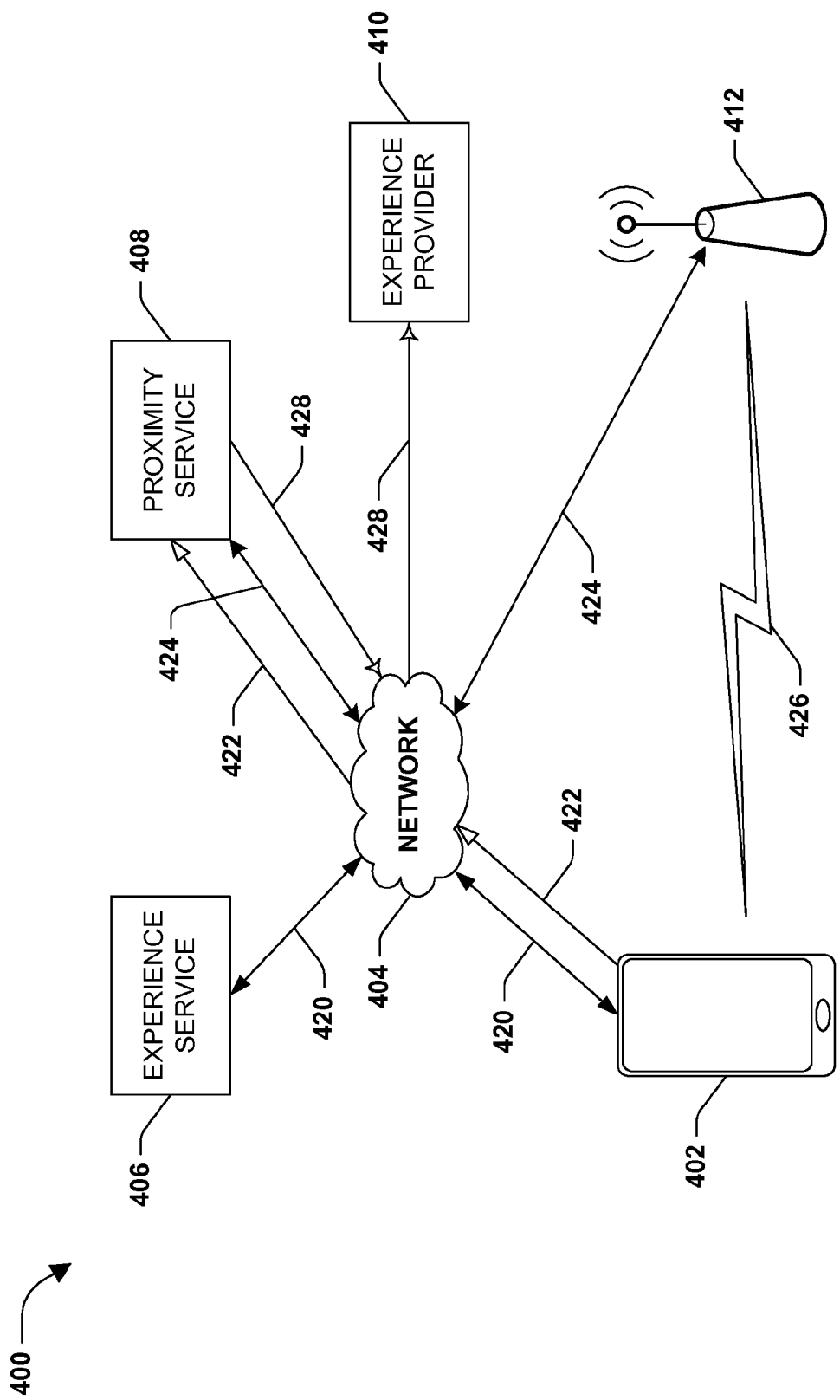
FIG. 4 is a component diagram of an example environment where one or more techniques described herein may be implemented.

At 304 in the example embodiment 300, the device can provide the estimated position to an experience service. As an illustrative example, FIG. 4 is a component diagram of an example environment 400 where one or more techniques described herein may be implemented. In the example environment 400, the device 402 can transmit 420 the position estimated by the device 402 (e.g., using GPS, and/or a location key) to an experience service 406, over a network 404, such as the Internet (e.g., or some other network connection between the device and the experience service). For example, the experience service may utilize a remote server, where information about user-experiences can be stored. In this example, the user-experience information can comprise location information for the user-experience (e.g., a position, and/or a desired threshold area for the experience).

Returning to FIG. 3, at 306, the experience service can identify a user-experience within a desired threshold of the position, and return information to the device for the identified user-experience. In one embodiment, information can be returned to the device for the identified user-experience, where the user-experience information is identified from a user-experience registered with a user-experience service for an area comprising the position.

For example, as illustrated by FIG. 4, the experience service 406 may comprise a plurality of registered user-experiences, and the one or more user-experiences that can be found within a threshold area around the position of the device can be returned 420 to the device 402. In one embodiment, the threshold may vary depending on a zoom level of the mapping service display, for example, growing larger as a map is zoomed out. In another embodiment, the threshold may be set by a provider of the user-experience 410, by the experience service, and/or by the mapping application on the user's device.

Returning to FIG. 3, in one embodiment, the information returned to the device, at 306, may comprise a list of one or more user-experiences available for the identified position of the device. At 308, the device can register for the user-experience by providing a near-field radio system identification for the device, such as via Bluetooth. For example, a Bluetooth protocol ID for the device can be provided. That is, while the description herein may, at times, indicate that a near-field radio system Bluetooth device ID and/or the like is provided, it is understood that Bluetooth may be more indicative of a protocol, and thus the ID that is provided for the device may, in one example, relate more to a protocol than a radio system. In any event, the device is able to be identified in some manner such that a user experience can potentially be had thereon. In one embodiment, the device may request to interact with the user-experience, for example, by selecting one of the one or more user-experiences returned by the experience service for the position. In this embodiment, a response request can be sent to the device to provide its near-field radio system ID, for example, to complete the device's registration for the user-experience.

As an illustrative example, in FIG. 4, the device 402 may receive 420 the list of user-experiences available near its location from the experience service 406, and select one with which to interact. For example, a user may be looking for an ATM to use near their location, and the experience service can provide a list of ATMs within the threshold for the device's position. The user can select their desired ATM with which to register using the device 402 (e.g., selecting an icon UI on the mapping application on their device).

In one embodiment, for example, the user may register to use the ATM by sending 422 the device's Bluetooth ID (or other near-field radio ID) to a proximity service 408, over the network 404. In another embodiment, for example, the user may send a request (e.g., either to the experience service or proximity service) to register for the ATM, and may receive a response to send their Bluetooth ID to complete the registration for the ATM user-experience.

In another example, the user may be in a location that comprises a plurality of console-type devices (e.g., console games, media provider consoles, etc.) distributed around the location (e.g., in different rooms of a house, hotel, convention, etc.), where the respective devices are linked to a monitor (e.g., television). In this example, the experience service 406 may provide a list of consoles in the area, and the user can select their desired console, such as one that has desired content or linked to particular monitor, and send their device's Bluetooth ID to the proximity service 408.

Returning to FIG. 3, at 310, the device's near-field radio ID, such as the Bluetooth ID, can be provided to the beacon for the user-experience. As described above in FIG. 2, the near-field beacon can be activated for the user experience. Further, as illustrated in FIG. 4, the proximity service 408 can communicate 424 with a beacon 412 for the user-experience to provide the Bluetooth ID provided for the user's device 402. In one embodiment, activating the beacon can comprise sending the near-field radio system ID for the device to the beacon. For example, the beacon 412 may not be activated until a near-field radio system ID is sent to the beacon 412, thereby activating it to find the device 402 comprising the ID. In another example, the beacon may be activated and may attempt to connect with the device. That is, the beacon may be activated and the device may merely be in a sleep, idle, listening, etc. mode, for example. When the device receives or "hears" a signal or request from the beacon, the device can then (wake-up and) transmit a response back to the beacon comprising the ID of the device. That is, rather than the device being more of the initiating component as may, at times, be provided herein, the device can (at least initially) be more passive with the beacon being more of an initiation component (e.g., initiating communications, dialog, etc. between the device and the beacon). In another example, the subsequent (higher fidelity) device location determination can be activated based upon a relative distance between a GPS position of the device and a GPS position of a beacon. For example, both the device and a beacon may be equipped with GPS and the respective GPS determined locations of the device and beacon can be can be examined to determine whether to activate, trigger, turn-on, etc. the secondary (e.g., Bluetooth) determination of the distance between the device and the beacon (e.g., to ultimately determine whether to activate one or more user experiences on the device). For example, the subsequent (e.g., Bluetooth) distance determination/verification may be warranted if there is sufficient overlap between the respective GPS determined locations of the device and the beacon (e.g., indicating that the user may potentially be "within range" of one or more available user experiences).

In one embodiment, an application can be activated for the user-experience that guides the user of the device to a desired distance from the beacon. For example, the museum that utilizes one or more beacons as interactive kiosks for the user-experience may use a first kiosk where the user can begin a tour of the museum. In this embodiment, for example, a mapping application on the user's device may employ an icon on the map, and/or directions, to guide the user to the first kiosk.

In one embodiment, a beacon locating application can be activated on the device, such as when activating the near-field radio system beacon, that directs the user of the device to the distance threshold from the beacon. For example, in FIG. 4, when the proximity service 408 sends 424 the near-field radio ID of the device to activate the beacon 412, the proximity service 408 may communicate 428 with the user-experience provider 410 to activate the beacon locating application on the user's device, such as over the network 404. For example, the user may be linked to the experience provider 410, such as by previously downloading an application to their device 402 in order to utilize the user-experience. In this embodiment, for example, the application downloaded to the device 402 can be activated to help the user find the beacon 412.

Returning to FIG. 3, at 312, the beacon activated with the device's ID can search for the device. For example, the near-field radio system typically has a limited range of detection/communication (e.g., up to three-hundred feet). In this example, the range of the near-field radio system can overlap the approximate error of the location position system, such that an up to eighty foot error of the GPS is overlapped by the up to three-hundred foot range of the Bluetooth. Further, as described above, an application on the device can help the user move toward the beacon, for example, to improve detection potential.

At 314, the beacon can detect the device, such as by detecting a signal sent from the near-field radio component in the device broadcasting its ID, and a distance between the device and the beacon can be identified and reported. In one embodiment, identifying the distance of the device from the beacon can comprise measuring a time of response from a sending of a ping from the beacon to the device. For example, upon detection of the device ID, the beacon can ping the device and measure a response time. In another embodiment, identifying the distance of the device from the beacon can comprise measuring a signal strength of the near-field radio system from the device. For example, the strength of the radio transmission from the device can be determined by the beacon to identify a distance.

As an illustrative example, in FIG. 4, the beacon 412 can detect the signal 426 from the user's device 402, and the distance between the device and beacon can be reported back 424 to the proximity service 408. In this example, the proximity service 408 can report the distance to the user-experience provider 410, which it turn may update the application running on the user's device 402 that is directing the user toward the beacon 412.

Returning to FIG. 3, at 316, when the distance between the device and the beacon meets a desired distance threshold, the user-experience can be activated on the user's device. In one embodiment, the distance threshold may be set according to the user-experience. For example, in a museum, store, or kiosk user-experience, the user may need to be within approximately five feet of the kiosk in order to appreciate the experience provided (e.g., an interactive display, a viewing area, an audio area, products, information, etc.). As another example, when using an ATM or similar dispensing device the user may wish to be closer in order to receive their money, and/or for security purposes. As another example, when using a console-type device linked to a monitor, the user may merely need to be within viewing distance of the monitor (e.g., ten to twenty feet) to employ to the user experience.

Further, as an illustrative example, the activation of the user-experience may comprise different things for different experiences. For example, when using the ATM, the user may employ a secure application on the device to communicate with the ATM to perform a transaction, thereby mitigating a need to actually enter information into the ATM (e.g., only use the device to perform the transaction). In this way, in this example, the user-experience is merely activated when the user device with the correct ID comes within the desired proximity of the ATM (e.g., enters appropriate security information into the ATM via the device). As another example, when the console comprises the user-experience, an application may activate on the user's device that allows the user to interact with the console (e.g., like a remote control).

At 318 in the example embodiment 300, the user-experience is deactivated when the user's device is outside the distance threshold. In this embodiment, the user-experience can be deactivated on the user's device upon the device moving outside of the distance threshold from the beacon. For example, once the user moves away from the beacon (e.g., kiosk, ATM, console, etc.), the user-experience can be ended, such as by closing the interactive program on the device. In one embodiment, the application on the user device, and/or the kiosk, may provide a warning to the user when they approach the position threshold boundary. For example, this may provide notice to the user that the user experience will be terminated if they proceed outside of the boundary. As an example, the deactivation can provide security for sensitive transactions (e.g., ATM), and mitigate unnecessary use of the kiosk, console, etc., when the user leaves the area.

In one embodiment, at least three beacons may be activated so that a beacon triangulated position of the device may be identified. For example, the position of the device (e.g., determined by GPS) can comprise an approximate position of the device (e.g., thirty to eighty feet approximation), such as on a map, and the beacon may determine a distance from the beacon (e.g., by detecting signal strength). In this embodiment, for example, three beacons in different location can respectively identify a distance to the device, thereby triangulating a position of the device with a greater degree of fidelity (e.g., accuracy, precision, etc.).

As an example, GPS systems are typically not well equipped to identify a location of the device inside a building, due to line of site limitations of the satellites. In this example, beacons strategically located throughout a building may be able to track movements of the device throughout the building, as well as on different levels (e.g., floors). Further, for example, the mapping application may provide markers on the map indicating a location of beacons, points of interest, etc., relative to the user's position.

A system may be devised that can identify a more accurate location of a user's device, for example, while mitigating location spoofing of a user's device. For example, user experiences that may be accessed on a user's mobile device (e.g., via one or more applications) can be interactive with regard to the user's current environment. Further, GPS data that may approximate a location of the user's device may not provide enough fidelity for the user-experience, and may also be able to be spoofed (e.g., purposely provide false information). Systems, described herein, can utilize two locating technologies to improve the location awareness and mitigate location spoofing for user-experiences. Spoofing can be made more difficult and thus potentially less likely to occur, for example, by implementing low power-short range radio signals (e.g., via Bluetooth), at least with regard to making a second higher fidelity, resolution, granularity, etc. device location determination.

Figure 5:
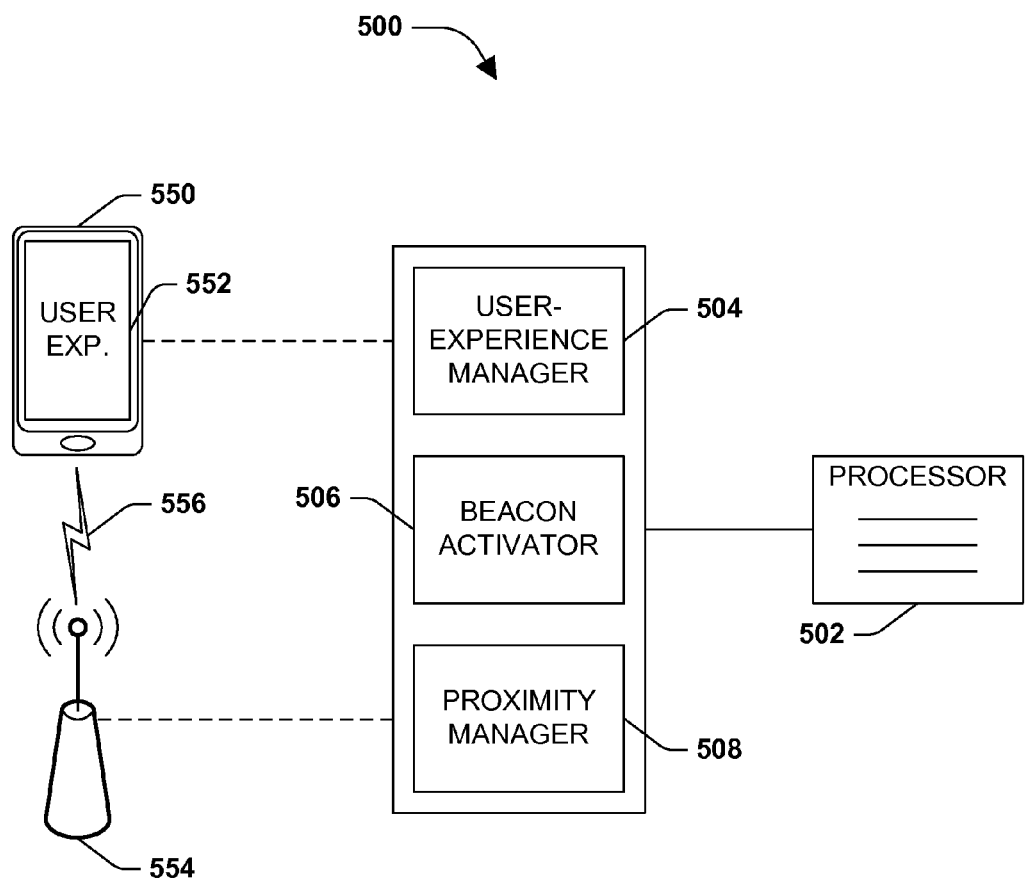
FIG. 5 is a component diagram of an exemplary system for improving location awareness of a device.

FIG. 5 is a component diagram of an exemplary system 500 for improving location awareness of a device. A computer-based processor 502 is configured to process data for the system, and is operably coupled with a user-experience management component 504, among others. The user-experience management component 504 provides an identity of a user-experience 552 to the device 550, where the user-experience 552 is available to the device 550 in an area comprising a position of the device 550. For example, a position of the device may be identified by a location component (e.g., GPS) on the device and provided to the user-experience management component 504, which can determine whether a user-experience is available for the device's current location.

A beacon activation component 506 is operably coupled with the processor, and is configured to activate a near-field radio system beacon 554 that is associated with the user-experience 552. The near-field radio system beacon 554 is activated in order to identify a distance 556 between the device 550 and the beacon 554, using a near-field radio system ID for the device 550.

For example, the user of the device 550 may select the user-experience provided by the user-experience management component 504, which can comprise sending the device's near-field radio system ID (e.g., Bluetooth ID), such as to the exemplary system 500. The beacon activation component 506 can communicate the device's near-field radio system ID to the beacon 554, for example, which may now be activated to identify the device 550 and determine the distance 556, such as by measuring a signal strength from the device's near-field radio system (e.g., Bluetooth transmitter).

A proximity management component 508 is operably coupled with the processor, and is configured to activate the user-experience 552 for the device 550 if a distance between the beacon 554 and the device 550 meets a distance threshold. For example, the beacon 554 can continue to measure the distance between to the device 550 by tracking the signal strength, and/or pinging the device, and report the data to the proximity management component 508.

In one embodiment, the beacon may merely transmit the signal strength, and/or response time to the proximity management component 508, which may determine the distance. In another embodiment, the beacon may use the collected data to identify the distance, which it can report to the proximity management component 508. When the user meets the distance threshold (e.g., is close enough to the beacon), for example, the user-experience can be activated on the user's device 550, such as by notifying a provider of the user-experience that can activate the user-experience 552 on the device 550 (e.g., over the Internet, or using a wireless signal).

Figure 6:
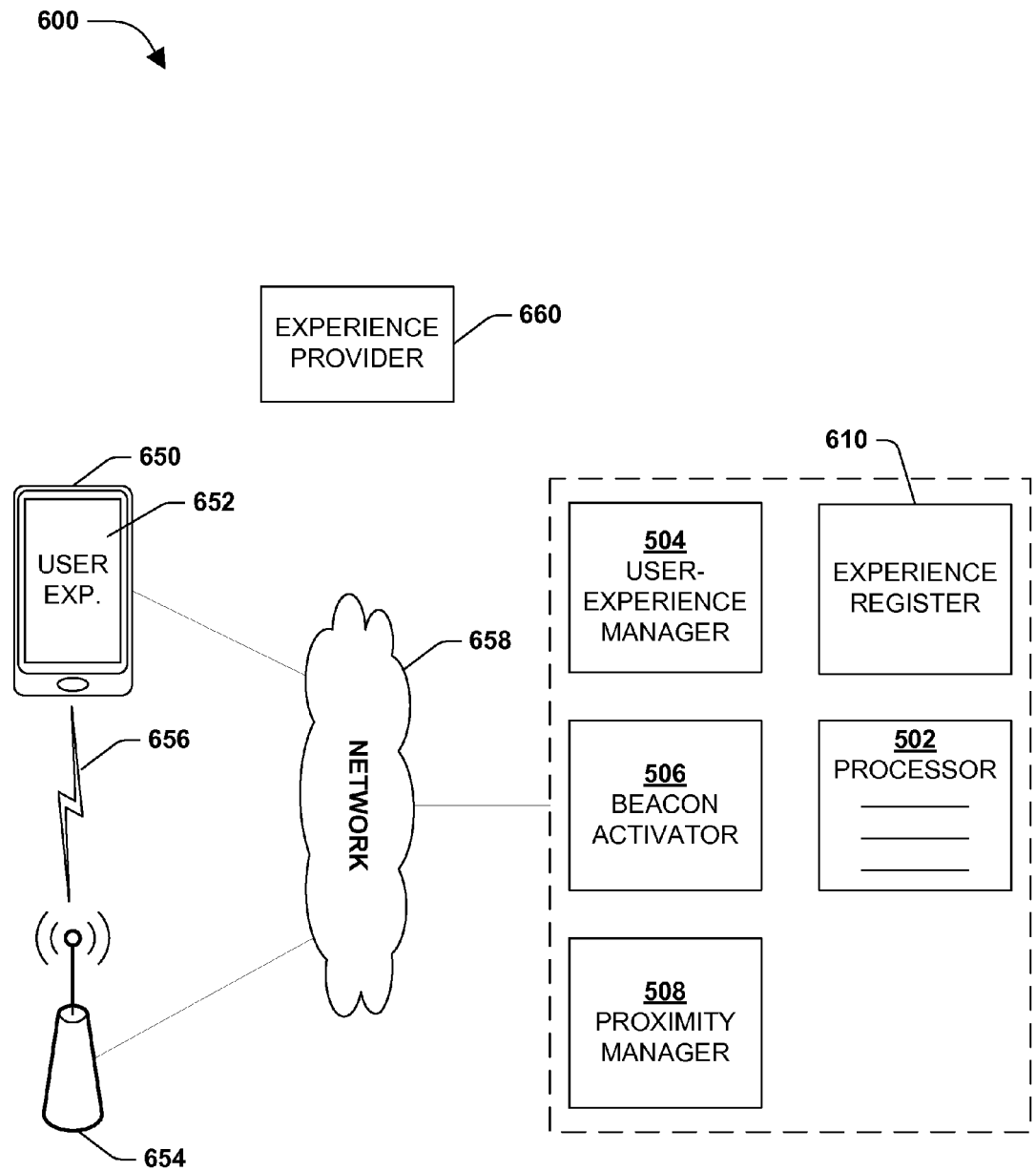
FIG. 6 is a component diagram illustrating one embodiment where one or more systems described herein may be implemented.

FIG. 6 is a component diagram illustrating one embodiment 600 where one or more systems described herein may be implemented. In this example, an extension of FIG. 5 is provided and thus description of elements, components, etc. described with respect to FIG. 5 may not be repeated for simplicity. An experience registration component 610 can register the user-experience 652 with the user-experience management component 504. In this embodiment, the user-experience 652 can be registered to at least a portion of a global area that is identified by an area identification key (e.g., a set of coordinates, grid sector ID, etc.). For example, a user-experience provider 660 may register the user-experience (e.g., interactive retail, interactive point or interest, transaction device, console-type device connected to a monitor, etc.) for a particular location.

In one embodiment, the user-experience management component 504 can identify the registered user-experience 652 that is available to the device 650 in an area that comprises the position of the device, which is received from the device. For example, the device 650 can identify its position, and send that info to the user-experience management component 504, and when a registered user-experience is identified in the area of the position of the device, associated information may be provided to the device 650, such as over a network 658 (e.g., Internet or wireless connection).

In one embodiment, the beacon activation component 506 can receive a device registration request for the user-experience 652, from the device 650, where the device registration request comprise the device's near-field radio ID (e.g., Bluetooth or some wireless ID). For example, a plurality of user-experiences may be identified for the device's position, and the user of the device can select one of the user-experiences with which to interact. In this example, when registering for the user-experience (e.g., to use an application that interacts with the user-experience), the device can send its near-field radio ID to the beacon activation component 506.

In one embodiment, the near-field radio system beacon 654 can comprise a Bluetooth beacon. Further, the Bluetooth beacon can identity a distance 656 to a Bluetooth enabled device 650, and can send distance data to the proximity management component. For example, when the beacon is activated with the Bluetooth ID of the device 650, it can detect a Bluetooth radio transmission signal from the device (e.g., broadcasting its ID). In this example, a strength of the signal can be used to identify a distance to the device. This information (e.g., the distance or the signal strength) can be transmitted to the proximity management component 508. The proximity management component 508 can receive the distance data, comprising the distance between the beacon and the device, which may be used to determine when the device 650 meets the threshold distance from the beacon 654, such that the user may enjoy the user experience.

Figure 7:
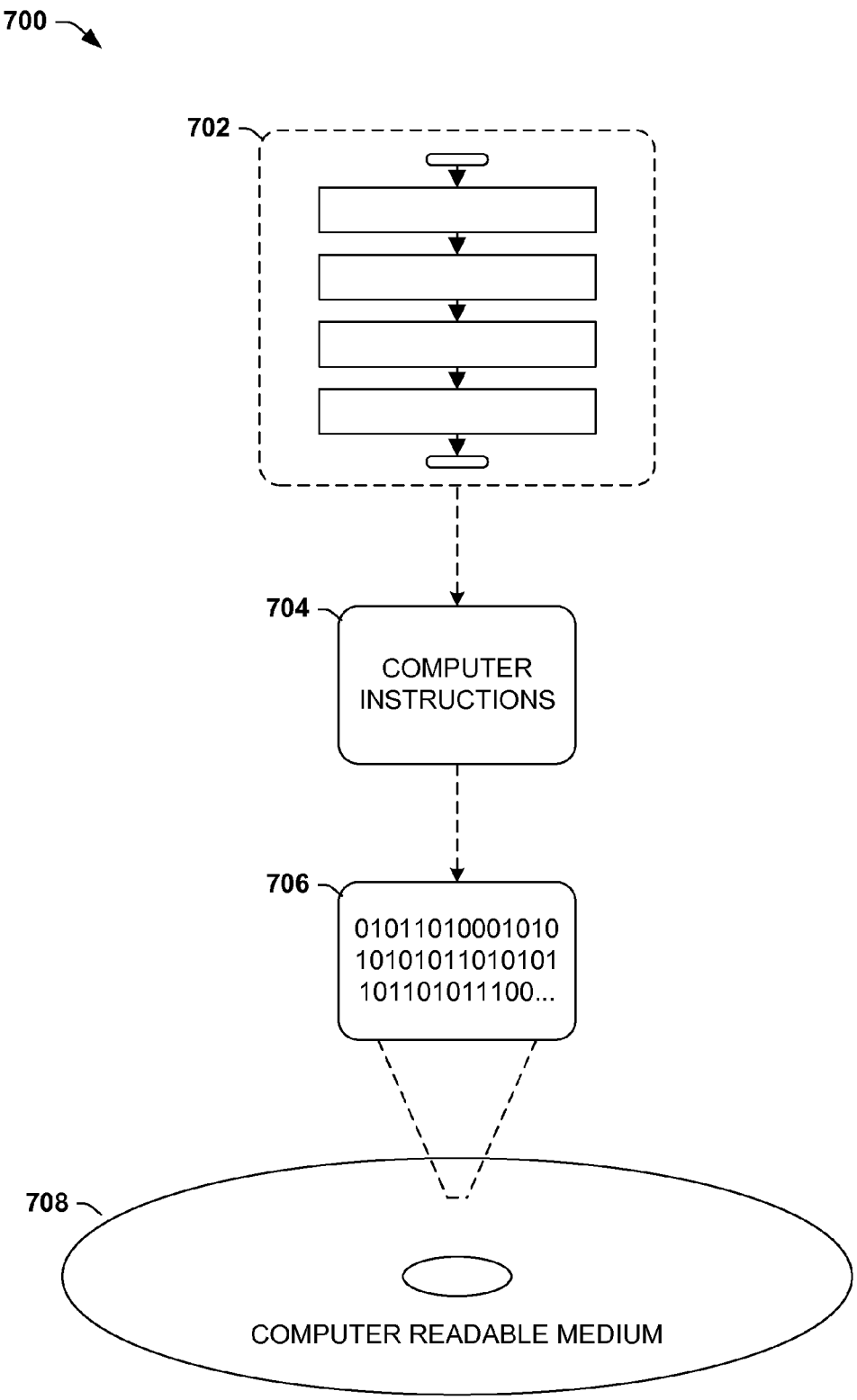
FIG. 7 is an illustration of an exemplary computer-readable medium comprising processor-executable instructions configured to embody one or more of the provisions set forth herein.

Still another embodiment involves a computer-readable medium comprising processor-executable instructions configured to implement one or more of the techniques presented herein. An exemplary computer-readable medium that may be devised in these ways is illustrated in FIG. 7, wherein the implementation 700 comprises a computer-readable medium 708 (e.g., a CD-R, DVD-R, or a platter of a hard disk drive), on which is encoded computer-readable data 706. This computer-readable data 706 in turn comprises a set of computer instructions 704 configured to operate according to one or more of the principles set forth herein. In one such embodiment 702, the processor-executable instructions 704 may be configured to perform a method, such as at least some of the exemplary method 100 of FIG. 1, for example. In another such embodiment, the processor-executable instructions 704 may be configured to implement a system, such as at least some of the exemplary system 500 of FIG. 5, for example. Many such computer-readable media may be devised by those of ordinary skill in the art that are configured to operate in accordance with the techniques presented herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used in this application, the terms "component," "module," "system", "interface", and the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, those skilled in the art will recognize many modifications may be made to this configuration without departing from the scope or spirit of the claimed subject matter.

Figure 8:
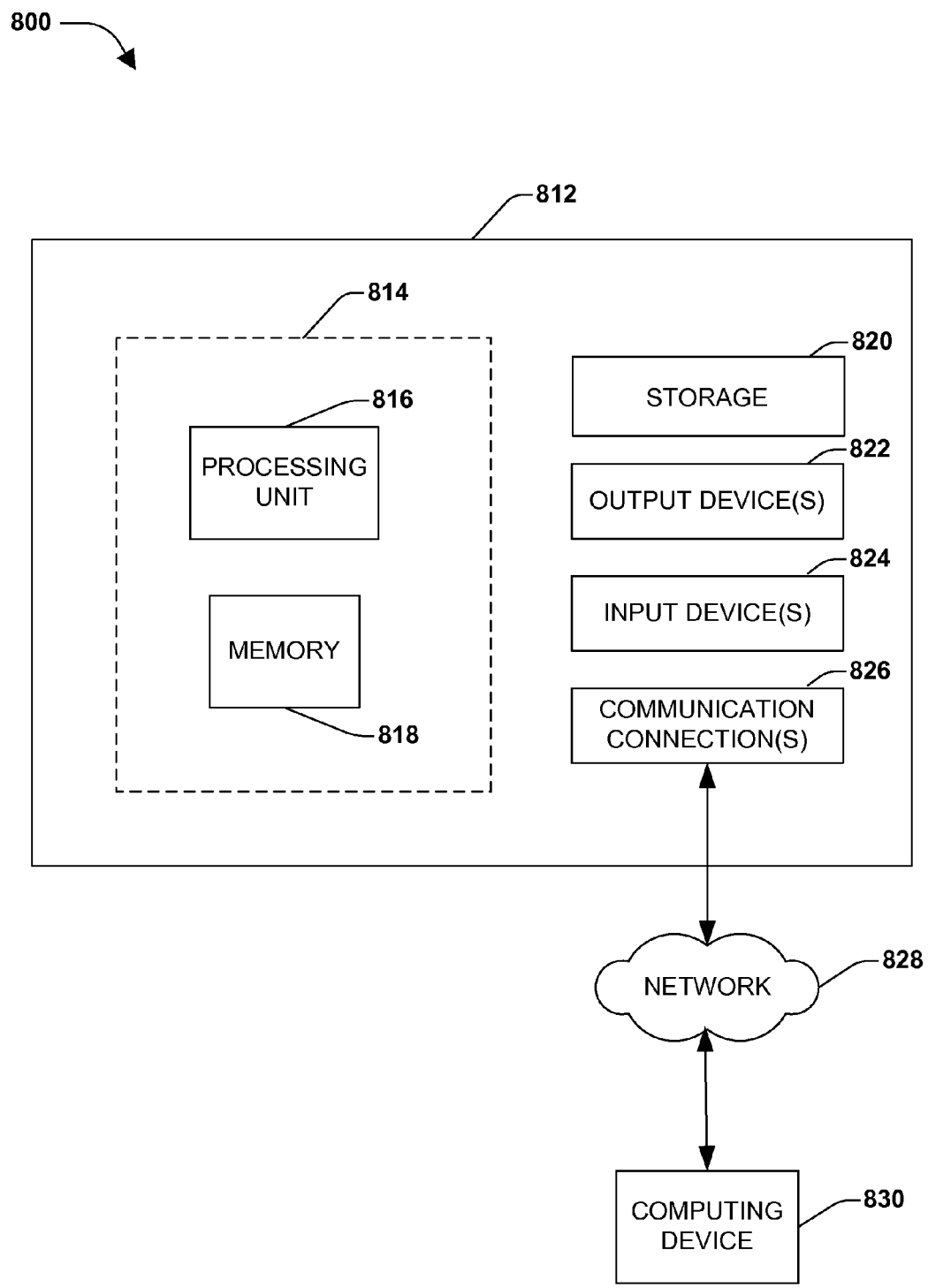
FIG. 8 illustrates an exemplary computing environment wherein one or more of the provisions set forth herein may be implemented.

FIG. 8 and the following discussion provide a brief, general description of a suitable computing environment to implement embodiments of one or more of the provisions set forth herein. The operating environment of FIG. 8 is only one example of a suitable operating environment and is not intended to suggest any limitation as to the scope of use or functionality of the operating environment. Example computing devices include, but are not limited to, personal computers, server computers, hand-held or laptop devices, mobile devices (such as mobile phones, Personal Digital Assistants (PDAs), media players, and the like), multiprocessor systems, consumer electronics, mini computers, mainframe computers, distributed computing environments that include any of the above systems or devices, and the like.

Although not required, embodiments are described in the general context of "computer readable instructions" being executed by one or more computing devices. Computer readable instructions may be distributed via computer readable media (discussed below). Computer readable instructions may be implemented as program modules, such as functions, objects, Application Programming Interfaces (APIs), data structures, and the like, that perform particular tasks or implement particular abstract data types. Typically, the functionality of the computer readable instructions may be combined or distributed as desired in various environments.

FIG. 8 illustrates an example of a system 810 comprising a computing device 812 configured to implement one or more embodiments provided herein. In one configuration, computing device 812 includes at least one processing unit 816 and memory 818. Depending on the exact configuration and type of computing device, memory 818 may be volatile (such as RAM, for example), non-volatile (such as ROM, flash memory, etc., for example) or some combination of the two. This configuration is illustrated in FIG. 8 by dashed line 814.

In other embodiments, device 812 may include additional features and/or functionality. For example, device 812 may also include additional storage (e.g., removable and/or non-removable) including, but not limited to, magnetic storage, optical storage, and the like. Such additional storage is illustrated in FIG. 8 by storage 820. In one embodiment, computer readable instructions to implement one or more embodiments provided herein may be in storage 820. Storage 820 may also store other computer readable instructions to implement an operating system, an application program, and the like. Computer readable instructions may be loaded in memory 818 for execution by processing unit 816, for example.

The term "computer readable media" as used herein includes computer storage media. Computer storage media includes volatile and nonvolatile, removable and non-removable media implemented in any method or technology for storage of information such as computer readable instructions or other data. Memory 818 and storage 820 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which can be used to store the desired information and which can be accessed by device 812. Any such computer storage media may be part of device 812.

Device 812 may also include communication connection(s) 826 that allows device 812 to communicate with other devices. Communication connection(s) 826 may include, but is not limited to, a modem, a Network Interface Card (NIC), an integrated network interface, a radio frequency transmitter/receiver, an infrared port, a USB connection, or other interfaces for connecting computing device 812 to other computing devices. Communication connection(s) 826 may include a wired connection or a wireless connection. Communication connection(s) 826 may transmit and/or receive communication media.

The term "computer readable media" may include communication media. Communication media typically embodies computer readable instructions or other data in a "modulated data signal" such as a carrier wave or other transport mechanism and includes any information delivery media. The term "modulated data signal" may include a signal that has one or more of its characteristics set or changed in such a manner as to encode information in the signal.

Device 812 may include input device(s) 824 such as keyboard, mouse, pen, voice input device, touch input device, infrared cameras, video input devices, and/or any other input device. Output device(s) 822 such as one or more displays, speakers, printers, and/or any other output device may also be included in device 812. Input device(s) 824 and output device(s) 822 may be connected to device 812 via a wired connection, wireless connection, or any combination thereof. In one embodiment, an input device or an output device from another computing device may be used as input device(s) 824 or output device(s) 822 for computing device 812.

Components of computing device 812 may be connected by various interconnects, such as a bus. Such interconnects may include a Peripheral Component Interconnect (PCI), such as PCI Express, a Universal Serial Bus (USB), firewire (IEEE 1394), an optical bus structure, and the like. In another embodiment, components of computing device 812 may be interconnected by a network. For example, memory 818 may be comprised of multiple physical memory units located in different physical locations interconnected by a network.

Those skilled in the art will realize that storage devices utilized to store computer readable instructions may be distributed across a network. For example, a computing device 830 accessible via network 828 may store computer readable instructions to implement one or more embodiments provided herein. Computing device 812 may access computing device 830 and download a part or all of the computer readable instructions for execution. Alternatively, computing device 812 may download pieces of the computer readable instructions, as needed, or some instructions may be executed at computing device 812 and some at computing device 830.

Various operations of embodiments are provided herein. In one embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein.

Moreover, the word "exemplary" is used herein to mean serving as an example, instance, or illustration. Any aspect or design described herein as "exemplary" is not necessarily to be construed as advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Further, At least one of A and B and/or the like generally means A or B or both A and B. In addition, the articles "a" and "an" as used in this application and the appended claims may generally be construed to mean "one or more" unless specified otherwise or clear from context to be directed to a singular form. Also, at least one of A and B and/or the like generally means A or B or both A and B.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure. In addition, while a particular feature of the disclosure may have been disclosed with respect to only one of several implementations, such feature may be combined with one or more other features of the other implementations as may be desired and advantageous for any given or particular application. Furthermore, to the extent that the terms "includes", "having", "has", "with", or variants thereof are used in either the detailed description or the claims, such terms are intended to be inclusive in a manner similar to the term "comprising."

What is claimed is:

1. A method for improving location awareness of a device, comprising:
   identifying a position of the device using a location positioning system;
   identifying a user-experience within a desired threshold of the position;
   using a near-field radio system beacon associated with the user-experience to identify a distance of the device from the beacon; and
   upon determining that the device is within a distance threshold from the beacon, activating an application associated with the user-experience on the device, the distance threshold based upon a type of the user-experience.

2. The method of claim 1, comprising receiving the position from the device, where the position is determined by one or more of:
   global positioning system (GPS) coordinates; or
   a location key global position representation.

3. The method of claim 1, comprising returning information to the device regarding the user-experience.

4. The method of claim 1, comprising returning information to the device regarding the user-experience, where the information is identified from a user-experience service for an area comprising the position.

5. The method of claim 1, comprising:
   receiving a request from the device to interact with the user-experience; and
   returning a request for the device to provide a near-field radio system ID for the device.

6. The method of claim 1, comprising activating a beacon locating application on the device that directs a user of the device to the distance threshold from the beacon.

7. The method of claim 1, comprising activating a second application associated with the user-experience that guides a user of the device to a desired distance from the beacon.

8. The method of claim 1, comprising using at least three beacons to identify a beacon triangulated position of the device.

9. The method of claim 1, using a near-field radio system beacon comprising using a Bluetooth beacon.

10. The method of claim 9, using a Bluetooth beacon comprising activating a Bluetooth signaling component in the device that utilizes a near-field radio system ID for the device, the near-field radio system ID comprising a Bluetooth identifier.

11. The method of claim 1, using a near-field radio system beacon comprising sending a near-field radio system ID for the device to the beacon.

12. The method of claim 1, identifying a distance of the device from the beacon comprising one or more of:
   measuring a time of response from a sending of a ping from the beacon to the device; or
   measuring a signal strength from the device.

13. The method of claim 1, comprising deactivating the application associated with the user-experience on the device upon the device being outside of the distance threshold from the beacon.

14. A system for improving location awareness of a device, comprising:
   a user-experience management component configured to provide an identity of a user-experience to the device, where the user-experience is available to the device in an area comprising a position of the device;
   a beacon activation component configured to use a near-field radio system beacon associated with the user-experience to identify a distance between the device and the beacon; and
   a proximity management component configured to activate an application associated with the user-experience for the device if the distance between the beacon and the device meets a distance threshold, the distance threshold based upon a type of the user-experience.

15. The system of claim 14, the position received from the device.

16. The system of claim 14, the beacon activation component configured to receive a device registration request for the user-experience, from the device, the device registration request comprising a near-field radio system ID for the device.

17. The system of claim 14, the proximity management component configured to receive distance data, comprising the distance between the beacon and the device, from the beacon.

18. The system of claim 14, comprising an experience registration component configured to register the user-experience with the user-experience management component.

19. The system of claim 14, the near-field radio system beacon comprising a Bluetooth beacon, configured to:
   identity a distance to a Bluetooth enabled device; and
   send distance data to the proximity management component.

20. A computer readable medium comprising computer executable instructions that when executed via a processing unit perform a method, comprising:
   receiving a position of a device using a location positioning system;
   identifying a user-experience within a desired threshold of the position;
   using a near-field radio system beacon associated with the user-experience to identify a distance of the device from the beacon; and
   upon determining that the device is within a distance threshold from the beacon, activating an application associated with the user-experience on the device, the distance threshold based upon a type of the user-experience.

* * * * *